United States Patent
Ohtsuji et al.

Patent Number: 5,351,806
Date of Patent: Oct. 4, 1994

[54] FLEXIBLE SCREW FOR CONVEYORS

[75] Inventors: Masaaki Ohtsuji; Takahisa Ito; Kiyoshi Furukawa, all of Amagasaki, Japan

[73] Assignee: Mitsubishi Cable Industries, Ltd., Hyogo, Japan

[21] Appl. No.: 28,955

[22] Filed: Mar. 10, 1993

[30] Foreign Application Priority Data

Mar. 11, 1992 [JP] Japan ................... 4-088035
Mar. 11, 1992 [JP] Japan ................... 4-088036

[51] Int. Cl.⁵ ............................. B65G 33/26
[52] U.S. Cl. ..................... 148/659; 198/676
[58] Field of Search ............ 198/659, 657, 676, 690.1

[56] References Cited

U.S. PATENT DOCUMENTS

| | | | |
|---|---|---|---|
| 2,620,917 | 12/1952 | Dahlbers | 198/659 |
| 3,141,545 | 7/1964 | Holland, Jr. | 198/659 |
| 3,191,762 | 6/1965 | Brietzke | 198/659 |
| 3,360,108 | 12/1967 | Voss | 198/659 |
| 3,381,801 | 5/1968 | Rastoin | 198/659 |
| 3,578,150 | 5/1971 | Pirovano et al. | 198/659 |
| 3,707,224 | 12/1972 | Rastoin | 198/659 |
| 3,727,746 | 4/1973 | Slusher | 198/659 |
| 5,295,573 | 3/1994 | Ohtsuji et al. | 198/659 |

FOREIGN PATENT DOCUMENTS

| | | |
|---|---|---|
| 045010 | 10/1990 | European Pat. Off. . |
| 1054013 | 3/1959 | Fed. Rep. of Germany ... 198/690.1 |
| 3006101 | 8/1981 | Fed. Rep. of Germany ...... 198/676 |
| 42-18782 | 9/1942 | Japan . |
| 50-102841 | 2/1949 | Japan . |
| 54-34978 | 8/1952 | Japan . |
| 56-132220 | 3/1955 | Japan . |
| 57-188713 | 5/1956 | Japan . |
| 54-17266 | 2/1979 | Japan . |
| 56-132218 | 10/1981 | Japan . |
| 59-62430 | 4/1984 | Japan . |
| 60-187113 | 12/1985 | Japan . |
| 0051411 | 3/1986 | Japan ................... 198/659 |

Primary Examiner—D. Glenn Dayoan
Attorney, Agent, or Firm—Wenderoth, Lind & Ponack

[57] ABSTRACT

A flexible screw for conveyors, which is made of a flexible rod and a polymer-coated cord helically wound on the rod, the cord being made of a core and a polymer layer formed on the core, and the core being a fiber bundle having a specific amount of buckling of not more than 0.3%. When the screw is used for transporting containers, it can adapt itself to a drastic change in the surrounding temperature and can endure a great tension caused by the transport of heavy containers, since winding pitch of the cord is not easily widened and the disturbance of the pitch can be prevented.

7 Claims, 2 Drawing Sheets ical field of the invention

FLEXIBLE SCREW FOR CONVEYORS

TECHNICAL FIELD OF THE INVENTION

The present invention relates to a flexible screw for conveyors, which is used in apparatuses for transporting containers, such as glass, plastic or aluminum bottles and cans which may be filled with liquids, solids or the like (hereinafter simply referred to as "containers"), or for transporting powder and granular materials such as coals, ores, grain, wood chips, plastic chips, cement and resin pellets. More particularly, the invention relates to a flexible screw for conveyors, which is suitably used in apparatuses for transporting containers.

BACKGROUND OF THE INVENTION

Screws wherein a metal wire such as a steel wire is helically wound around a flexible rod are used for transporting containers. A container transport apparatus using screws having such a structure is composed of two screws arranged in parallel at a specified distance from each other and are adapted to transport containers by rotating the screws, with tile neck of each container being held between the screws (usually with a flange at the neck of the container in engagement with shafts).

The apparatus transports containers by a principle entirely different from that of belt conveyors or roller conveyors which are usually used for container transport, i.e., by the frictional contact of the screws with the neck of the container, and permits more accurate container positioning, more facilitated automation of production lines, its simpler and more compact construction and lower equipment costs, as compared with conventional conveyors.

In the screw above, the wire helically wound is made of steel, and the neck of each container including its flange to be brought into contact with the wire is subject to abrasion or damage by rotation. Especially, great care should be given to the containers to be filled with a carbonated beverage to avoid flaws in the container.

For solving this problem, it has already been considered to use, in the place of the steel wire, a cord prepared by coating a polymer on a core of a bundle of twistings such as nylon. Since the surface layer of the cord is made from resin, the cord is advantageous in that the damage to the containers can be made less than do steel wires.

Cords having a core are generally produced by feeding a core in a direction under a given tension, extruding a polymer in a molten state onto the core from a die disposed coaxially therewith simultaneously with the advance of the cord to coat the core with the polymer, and cooling same. As the molten polymer solidifies, however, a buckling of the core occurs due to the difference in shrinkage between the polymer and the core. Upon application of a tension, the cord with buckling can be easily stretched for the same length as the core shrank.

According to the above-mentioned transport apparatus, containers are, with their own rotation, transferred by the sliding friction caused by a high speed rotation of the screw, which in turn means that the force to the direction which causes expansion of the winding pitch, namely, expansion of helical intervals of the cord acts repeatedly on the cord when containers advance on the cord. Accordingly, the cord is elongated on the rod to become loose in the course of operation due to the property of the cord mentioned above, thus resulting in an undesirable change in the winding pitch of the cord. The disturbance in the pitch makes container transport speed unsteady, and in an extreme case, the transport becomes impossible.

In view of the foregoing problems, it has been already proposed to use a polymer cord wherein the amount of the buckling of a core, i.e. a fiber bundle, is not more than 3.0% (WO 91/06493).

Out of the necessity to cope with the increasing force applied on a cord during transport of containers, which is caused by the growing container volume, and to meet the desire to develop a cord adaptable to a drastic change in the temperature of the environment in which the cord is used, requirements imposed on the cord have been becoming severer.

Accordingly, an object of the present invention is to provide a flexible screw for conveyors, which is free of disturbance in pitch caused by the growing container volume, and which can cope with changes in the temperature of the environment wherein the screw is used.

SUMMARY OF THE INVENTION

As the result of the intensive studies made by the present inventors, it has now been found that only when a polymer cord wherein a core fiber bundle has a specific amount of buckling of not more than 0.3% is used, the above-mentioned object can be achieved.

That is, the present invention provides a flexible screw for conveyors, which comprises a flexible rod and a polymer-coated cord helically wound on the rod, said core being a fiber bundle having specific amount of buckling of not more than 0.3%.

Furthermore, when the polymer layer of the cord has specific properties, or when at least either the polymer layer of the cord or the polymer layer of the rod has specific properties, in case where a polymer layer is formed on a metal rope, the polymer layer(s) show(s) excellent abrasion resistance and small frictional resistance, thus resulting in a prolonged service life of screw and reduction in the maintenance costs.

DETAILED DESCRIPTION OF THE INVENTION

Figure 1:
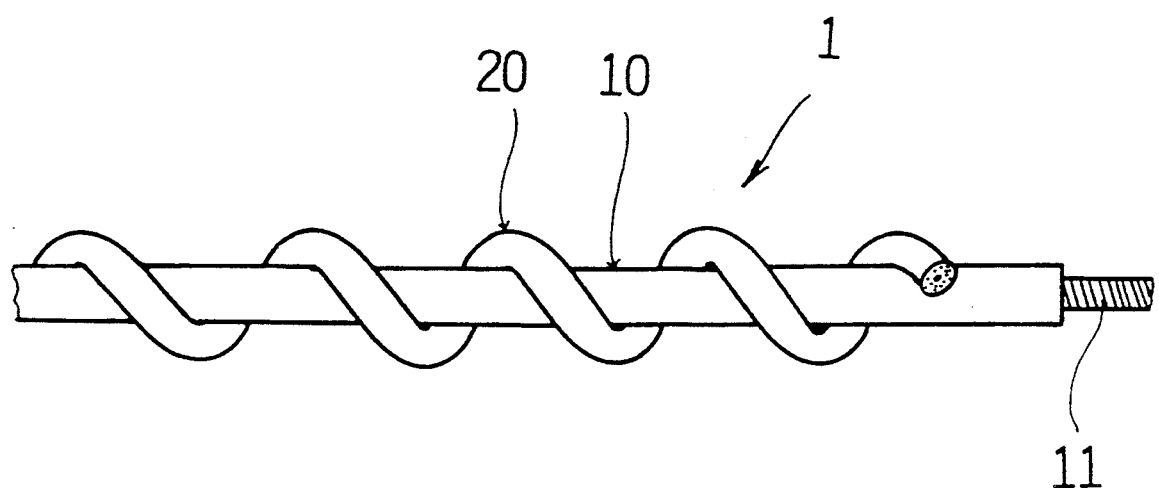
FIG. 1 is a perspective view partly broken away which shows one example of the flexible screw embodying the invention.

The presence of a core is advantageous in that a disturbance in the winding pitch of the helically wound cord can be inhibited, since elongation of the cord due to a temperature rise caused by frictional heat, a tensile lead applied during transport of containers, or the like can be avoided. In the present invention, the specific amount of buckling of the core in the cord is determined to be up to 0.3%.

The specific amount of buckling is determined for a cord having an initial length $L_o$ and comprising a core coated with polymer, by removing the polymer layer from the core and measuring the length L of the Core as tensed by a force 1/1000 of the tensile strength of the core, and is expressed in terms of the ratio of the difference between the length L and the initial length $L_o$ to the initial length $L_o$. Thus, the specific amount of buckling $\epsilon$ is given by the equation:

$$\epsilon = \frac{L - L_o}{L_o} \times 100(\%)$$

In the present invention, the specific amount of buckling of the core in the cord is not more than 0.3%, preferably not more than 0.1%, more preferably not more than 0.05%. The cord having a core with the specific amount of buckling of not more than 0.3% shows substantially no elongation. With such a cord, undesirable change in pitch can be avoided even when the cord is used for transporting massive containers, or even when the environmental temperature has widely changed.

The present invention encompasses a case where the specific amount of buckling shows negative values, namely, widen L is smaller than $L_o$. In such a case, a core has been stretched by a force greater than appropriate in a polymer-coated core, and in determining the specific amount of buckling, the core is released from the stretch forced by the polymer layer so that the cord shrinks to the extent that $(L-L_o)$ shows a negative value, even against the predetermined tension applied on the core. While an excessively negative value of the specific amount of buckling may lead to a breakage of the core during use, the specific amount of buckling not less than −0.5%, preferably not less than −0.1% is preferable.

The material of the fiber bundle serving as the core of a cord in the present invention is not specifically limited insofar as the core acts as a tension member for the cord. Examples of usable fibers are natural fibers (vegetable fibers such as cotton, flax, hemp and coconut fibers, and animal fibers such as wool and silk), semisynthetic fibers such as acetates, synthetic fibers such as polyamide fibers (e.g. nylon 6), aramid fibers (e.g. Kevlar), polyester fibers (e.g. Tetoron), polyacrylonitrile fibers (e.g. acrylic fibers and modacrylic fibers), polyvinyl alcohol fibers, polyvinyl chloride fibers, polyvinylidene chloride fibers, polyolefin fibers (e.g. polyethylene, polypropylene), and polyurethane fibers, inorganic fibers such as glass fiber, graphite fiber, boron fiber, various metal fibers and carbon fibers, and so on. Of these, Kevlar is preferred in view of high strength, excellent fatigue resistance, excellent heat resistance, low creep property, etc. The core to be used is usually one composed of a multiplicity of fibers which are twisted together. The size of the bundle of fibers, which is dependent on the material of the core and the outside diameter of the cord, is 1,000 to 15,000 denier, preferably 1,500 to 9,000 denier. The number of fibers to be twisted into the bundle is 666 to 10,000, preferably 1,000 to 6,000.

Any polymer can be used as a polymer to be coated on the core, insofar as the polymer can be melt-extruded through a die. However, since containers are transported by the rotation of a screw equipped in a container transport apparatus, it is important for the objects to be transported, and from the aspect of safety that the neck of a container including its flange to be directly brought into contact with the cord helically wound on a flexible rod be free of abrasion or damage. Accordingly, polymers excellent in abrasion resistance, flexibility, rolling property and sliding property, and having a small coefficient of dynamic friction including sliding friction and rolling friction are preferable as the polymer to be coated on the core.

When the screw is used in the apparatus for transporting powder and granular materials, the cord preferably has an abrasion resistance and a strength sufficient to endure abrasion, friction, etc. produced by those materials, since the powder and granular materials are transported by the rotation of a shaft. The term "powder and granular materials" as used herein refers to so-called bulk materials such as gravel, broken stones, coals, cokes, iron ores, earth, limestone, grain, cement, chips or pellets of woods and resins, etc.

Examples of the polymer to be coated on the core are polyalkylenes such as various polyethylenes and polypropylenes, polyethers such as polyacetal and polyphenylene ether, polyamides such as nylon 6, nylon 6,6 and nylon 11, fluorocarbon resins such as polytetrafluoroethylene and tetrafluoroethylene perfluoroalkyl vinyl ether copolymer, polyesters such as polyethylene terephthalate and polybutylene terephthalate. Examples of the preferred polyethylenes are ultrahigh-molecular weight-polyethylenes and modified ultrahigh-molecular weight-polyethylenes having an improved injection-moldability, and a preferred example of such a modified ultrahigh-molecular-weight polyethylene commercially available is Lubmer, product of Mitsui Petrochemical Industries, Ltd. Of these, Lubmer is especially preferable from the viewpoints of sliding property and durability.

Although the methods for preparing the polymer-coated cord wherein the specific amount of buckling of the core is not more than 0.3% using a bundle of fibers for the core and a coating material for the polymer layer are not particularly restricted, the following method is the most preferable. In this method, the core consisting of a bundle of fibers is fed in a direction under a given tension, a polymer in a molten state is extruded onto the core from a die disposed coaxially therewith simultaneously with the advance or the cord to coat the core with the polymer, and the extruded polymer is cooled while the polymer is kept in a certain shape in the die until at least the extruded polymer is not expanded by an internal pressure caused by the tension on the core, whereby a polymer-coated cord is provided. While this method resembles to the conventional methods for preparing such cords, the major difference between this method and the conventional methods is that the extruded polymer is kept in a certain shape (generally a cylindrical shape) while cooling in a die having a certain length, during which time the core is kept under a tension.

Figure 3:
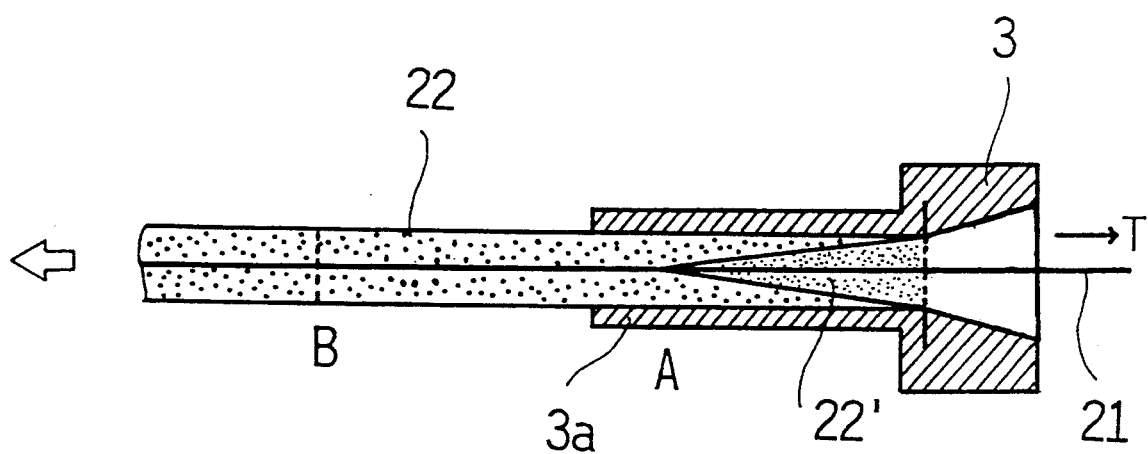
FIG. 3 is a vertical section for illustrating the principle of forming a cord.

The method as mentioned above is more specifically illustrated in the following. FIG. 3 is a vertical section to illustrate the principle of forming a cord. In FIG. 3, a core 21 consisting of a bundle of fibers is fed in the direction opposite to the direction of an arrow at a constant speed under a given tension T in the direction of the arrow. A molten polymer 22' is extruded through a die 3 and coated on the core 21, and the core thus coated moves in the direction of an outlet of the die 3 along with the advance of the core 21. The die 3, being different from conventional dies for melt-extruding, has a cylindrical, long size portion 3a with a certain diameter, and the extruded polymer is cooled while being kept in the long size portion 3a. Solidification of the molten polymer 22' begins from the part in contact with the long size portion 3a, and proceeds cortically toward the center of the core 21. The molten polymer is kept in the die until the internal pressure due to the tension T on the core does not cause the expansion of the extruded polymer. Accordingly, it is essential that the cylindrical, long size portion 3a should have a length long enough to avoid occurrence of buckling of the core upon release of the cord from the cylindrical, long size portion 3a. The length is suitably selected according to the kind of the polymer to be melted, delivery speed of the core, and the like.

In FIG. 3, the point on which the molten polymer 22' begins to solidify toward the center is A, and the point on which the temperature of the innermost end of the solidified polymer layer reaches normal temperature is B. It is known that the solidification of fluids of the kind including the molten polymer as mentioned above generally begins from the outside of the polymer layer to the center where a core exists, and that the most of buckling occurs between the point when the solidification reaches the innermost end of the polymer layer and the point when the temperature of the innermost end of the polymer layer becomes normal temperature. Accordingly, the tension T to be applied to the core while the extruded polymer is in the die is such that the buckling occurred between the points A and B can be elongated thereby, and is preferably corresponding to the tensile strength and delivery speed dependent on the core material. Thus obtained cord theoretically has no stress or buckling.

The die used in the above-mentioned method is not subject to limitation, and known dies used for melt-extrusion of cords are sufficiently used. In the present invention, it is preferable to use a die having a cylindrical, long size portion further attached to one of those known dies at its downstream side (see U.S. Pat. No. 3,928,525).

The outer diameter of the polymer-coated cord is generally from about 0.1 to 1 D, preferably from about 0.2 to 0.8 D.

It is important that the flexible screw of the invention should have rigidity sufficient for the screw to satisfactorily transmit the rotational torque delivered from one end of the screw to the other end thereof, and flexibility permitting the screw to be installed easily along curved paths of transport. The both characteristics of flexibility and rigidity can be obtained by using a flexible substance as a rod.

The rod in its entirety may be made of polymer, but a rod made of a metal rope is preferable. Examples of the metal rope are those made of metals including iron steel, nickel, cobalt, and alloys of such metals. A preferable metal rope comprises a strand of several to tens of wires having a diameter of about 0.2 to 2.0 mm stranded together, and tens of strands stranded around said strand.

While the flexible rod may be constituted by a metal rope alone, a polymer layer may be further formed on the metal rope. The polymer layer is formed on the metal rope to make the rough surface of the metal rope even and uniform. While no limitation is imposed on the polymer to be coated on the rope, the polymer is required to have superior abrasion resistance and small contact resistance, as are required of the polymer used for the polymer-coated cord, since the neck and the flange of containers move at high speed in direct, sliding contact with the rod.

Examples of the polymer to be coated on the metal rope are those to be coated on the core. Of those, Lubmer is preferable.

To improve the abrasion resistance of the portion of a rod which comes in contact with containers, a polymer having specific properties is preferably used for the polymer layer on the metal rope.

That is, when the polymer layer is prepared from a polymer having a flexural modulus of not more than 3000 kgf/cm$^2$, a coefficient of friction of not more than 2.0 and an abrasion loss of not more than 25 mg, the obtained polymer layer is remarkably improved in abrasion resistance.

Although it appears that a small flexural modulus, and a small coefficient of friction and a small abrasion loss as properties of polymer do not stand without contradiction, they are the necessary properties for the polymer forming the polymer layer of the flexible screw of the present invention, since the polymer usable in the invention is required to have both the flexibility and the durability at the same time. Accordingly, the polymer preferably has a flexural modulus of not more than 3000 kgf/cm$^2$, more preferably not more than 2000 kgf/cm$^2$ so as to secure sufficient flexibility, as well as a coefficient of friction of not more than 2.0, more preferably not more than 1.5 and an abrasion loss of not more than 25 mg, more preferably not more than 10 mg so as to secure durability.

When the flexural modulus is more than 3000 kgf/cm$^2$, the polymer is too hard to give sufficient flexibility to the polymer layer. On the other hand, when the flexural modulus is too small, in other words, when the polymer is too soft, the coefficient of friction becomes greater, with the result that a smooth transport of containers is unobtainable, and the durability of the polymer layer cannot be secured since the polymer layer easily wears away. In the present invention, the polymer having the aforementioned upper limits in coefficient of friction and abrasion loss is used to secure durability of the polymer layer.

The polymer having the specific physical properties as mentioned above is excellent in both flexibility and durability. Therefore, the flexible screw of the present invention which uses such a polymer is beneficial in that the abrasion loss caused by coming into sliding contact with the containers during transport is less, the service life of the screw is extended, and that the maintenance costs can be reduced.

The flexural modulus is determined according to ANSI/ASTM D 790-71.

The coefficient of friction is determined by a Suzuki coefficient of friction test using a steel (S-45C) under the conditions of a surface pressure of 5 kgf/cm$^2$ and a sliding velocity of 0.2 m/second.

The abrasion loss is determined by using a Taber abrasion tester under the conditions of an H-22 abrasion ring, a load of 1 kg, and rotations of 1000 times.

Examples of the polymers satisfying the requirements as mentioned above are flexible (soft) fluorocarbon resins, medium density polyethylenes, low density polyethylenes, polyamide elastomers (for instance, those commercially available from Industries, Ltd. under a trade mark "PAE 1200"), thermoplastic urethanes (for instance, those commercially available from KURARAY CO.,LTD. under a trade mark "KURAMIRON 9198"), thermoplastic polyesters (for instance, those commercially available from TOYOBO CO., LTD.

under a trade mark "PELPRENE S1001-04"). Of these, soft fluorocarbon polymers are preferable.

The soft fluorocarbon resins used in the present invention include fluorocarbon resins grafted onto fluorocarbon elastomer, thermoplastic fluorocarbon elastomers comprising fluorocarbon resin(s) as a soft segment and fluorocarbon elastomer(s) as a hard segment, and fluorine-containing copolymers. Concrete examples thereof are fluorocarbon resins wherein vinylidene fluoride is grafted onto a main chain of fluorocarbon elastomer such as vinylidene fluoride-hexafluoropropylene copolymer or vinylidene fluoride-hexafluoropropylene-tetrafluoroethylene terpolymer (for instance, those commercially available from Central Glass Co., Ltd. under a trade mark "CEFRALSOFT 150"), thermoplastic fluorocarbon elastomers comprising 85% by weight of a soft segment of vinylidene fluoride-hexafluoropropylenetetrafluoroethylene terpolymer (molar ratio of 50:30:20) and 15% by weight of a hard segment of ethylene-tetrafluoroethylene-hexafluoropropylene terpolymer (molar ratio of 43:49:8) (for instance, those commercially available from DAIKIN INDUSTRIES, LTD. under a trade mark "DAI-EL T530"), tetrafluoroethylene-propylene copolymers, and tetrafluoroethylene-ethylene copolymers. Of these, CEFRALSOFT 150 is particularly preferable.

For improving coefficient of dynamic friction, tetrafluoride lubricants (for instance, those commercially available from DAIKIN INDUSTRIES, LTD. under a trade mark "DAIKIN POLYFOLW LOW POLYMERS") may be added, and for improving abrasion resistance, inorganic or organic powders such as graphite, silicon carbide, boron nitride, molybdenum, triazine bismaleimide powders may be added to the polymers.

The amount of such additives is generally from 1 to 20 parts by weight, preferably from 1 to 5 parts by weight based on 100 parts by weight of the polymer.

In the present invention, the above-mentioned polymer is used for at least either the polymer layer to be formed on the flexible rod or the polymer layer of the polymer-coated cord, with preference given to its use for the polymer layer of the flexible rod. Note that the object of the present invention can be accomplished even when only a portion which comes into sliding contact with containers to be transported is provided with the polymer layer mentioned above, and it is not necessary that the entire surface of the metal rope or the core is coated with the polymer as mentioned above having the specific properties. The polymer layer(s) of the rod or the cord may be entirely made from the above-mentioned polymer, or only the surface layer may be made from the polymer when the polymer layer is a multi-layer.

The polymer layer is formed entirely or partially on the metal rope by conventional extrusion coating, or by winding a tape of the polymer around the overall surface of the metal rope or winding the tape with a gap between the windings. In the case of extrusion coating, a metal rope is coated with the polymer by feeding the rope in a direction under a given tension and extruding the polymer in a molten state onto the rope from a die disposed coaxially therewith simultaneously with the advance of the rope.

The thickness of the polymer layer on the rod or of the cord depends on the purpose of use and size of a screw. Usually, the thickness is from 0.1 to 2.0 mm, preferably not more than 1.0 mm, more preferably from 0.2 to 0.6 mm. The thickness of the polymer layer is desirably uniform to the greatest possible extent to give an improved concentricity to the screw.

The outer diameter of a finish rod with or without a polymer layer depends on containers to be transported. In the case of, for example, a rod for transporting bottles used in regular homes, the outer diameter is from about several to dozens of mm, preferably from about 3 to 30 mm.

For diminishing the friction between the metal wires constituting the metal rope, and/or between the metal rope and the polymer layer formed on the metal rope, in order to improve durability of a screw, lubricants may be contained in the rope between the metal wires therein and/or in the gap between the polymer layer and the rope. Any known natural or synthetic lubricants may be used in the present invention for this purpose. In particular, lubricants in the state of a liquid or a semi-solid at around room temperature are preferably used. Examples of such lubricant are petroleum oils such as liquid paraffins, spindle oils, transformer oils and cable oils, vegetable oils such as caster oil and olive oil, synthetic lubricants such as silicone oils, polybutene oil, dodecylbenzene oil, diester oils, polyalkylene glycol oils, and halogenated hydrocarbon oils. Also, various greases are preferably used. These lubricants may be used alone or as a mixture thereof.

The lubricant can be contained in the gap between the metal rope and the polymer layer by, taking the case of melt-extrusion coating of a metal rope for example, impregnating the rope with the lubricant prior to introducing the rope into the die for melt-extrusion, then forming a polymer layer on the rope by extrusion coating. The impregnation can be performed by, for instance, soaking the metal rope in a lubricant.

If it is difficult to sufficiently impregnate a lubricant between the wires in the metal rope by the above-mentioned method when using the lubricant having a relatively high viscosity such as greases, the viscosity of the lubricant may be decreased by heating before proceeding to the procedure as mentioned above, or a rope is passed through a rubber chamber filled with a lubricant before proceeding to an extrusion coating step, whereby the rope is impregnated with the lubricant. The method for filling a lubricant in the chamber is optional and it may comprise providing the chamber with pin holes on the bottom and on the top surface of the chamber, and filling the chamber with the lubricant by pressure from the pin hole on the bottom surface, such that the redundant lubricant is discharged from the pin hole on the top surface of the chamber. By passing through the chamber, the metal rope is impregnated with the lubricant, and the surface of the rope is coated with the lubricant as well. Thereafter, the polymer layer is formed on the rope by extrusion coating to give a flexible rod containing the lubricant between the metal wires in the rope and in the gap between the rope and the polymer layer. Or, the metal rope may be impregnated with a lubricant when stranding the metal wires.

The amount of the lubricant is such that it is sufficient to cover the surface of the metal wires constituting the metal rope and/or such that it is sufficient to diminish the friction between the metal rope and the polymer layer. Since the friction between the metal wires, and between the metal rope and the polymer layer is diminished by the use of a lubricant, durability of the flexible screw of the present invention can be remarkably improved as compared with the conventional screws.

The method for providing a cord helically around a flexible rod is not subject to particular limitation, and includes, for example, a method comprising integrally molding a cord and a rod, and a method comprising separately preparing a cord and a rod and winding the cord around the rod with or without subsequent bonding. Usually, the cord is wound loosely around the rod at room temperature, utilizing the stress relaxation of the cord. When the screw is for use for transporting containers, the winding pitch of the cord is selected according to container transport velocity, the size of the containers to be transported, the number of containers to be transported, speed of rotation of the screw, and so on.

When the screw is used for transporting powder and granular materials, the pitch is selected according to the kind and size of the materials to be transported, and so on. The pitch of the cord need not be consistent throughout the entire length of the screw, but may be altered, for example, at a desired portion of the screw.

When a turning effect is given to the flexible screw of the present invention, the rod and the cord helically wound thereon are rotated integrally.

The flexible screw of the present invention is more specifically described by means of the following Examples. However, it is to be understood that the present invention not limited to the following Examples.

Figure 2:
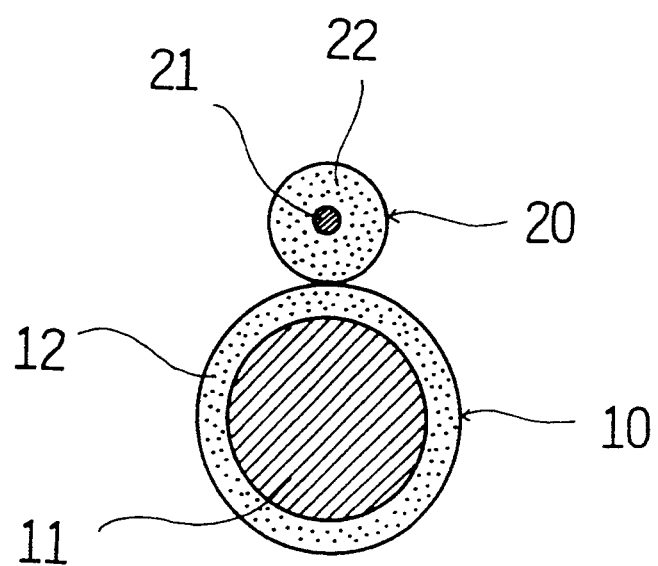
FIG. 2 is a transverse sectional view of the flexible screw shown in FIG. 1.

FIGS. 1 and 2 show one example of a screw 1 of the present invention. The screw 1 comprises a flexible rod 10 and a polymer-coated cord 20 helically wound on the rod 10. The rod 10 has a structure wherein a polymer layer 12 is formed on a metal rope 11. The cord 20 has a core of a bundle of fibers and a polymer layer 22 formed on the core.

Figure 4:
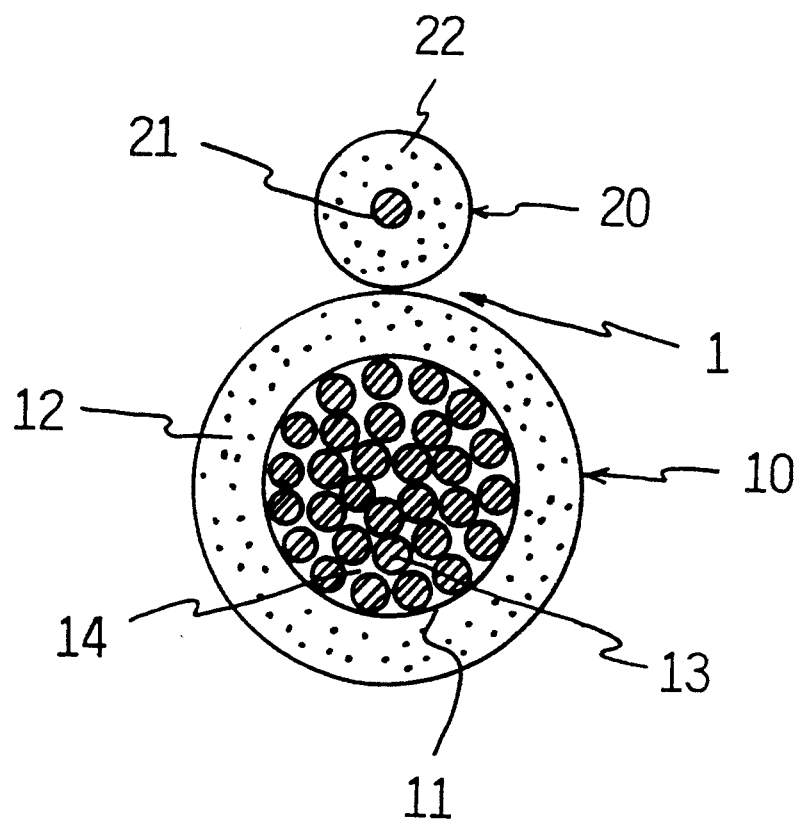
FIG. 4 is a transverse sectional view showing another example of the flexible screw embodying the invention.

Another example of the screw of the present invention shown in FIG. 4, wherein a flexible screw 1 comprises a flexible rod 10 and a polymer-coated cord 20, and a polymer layer 22 is formed on a core 21 to give the cord 20 to be helically wound on the rod 10. A lubricant 14 is contained in the gap between metal wires 13 in the metal rope 11.

Example 1

A cord having a specific amount of buckling of 0.05% was prepared from a bundle of Kevlar fibers as the core of the cord, and a Lubmer as the material for the polymer layer, by the method for preparing a cord as mentioned above. The obtained cord was wound helically around a flexible rod wherein a polymer layer comprising CEFRALSOFT (a trade mark of a soft fluorocarbon resin, made by Central Glass Co., Ltd.) had been formed on a steel rope, at a winding pitch of 35 mm to give a flexible screw as shown in FIG. 1. The screw was 7.0 mm in the diameter of the rod, 6.0 mm in the diameter of the steel rope, 0.5 mm in the thickness of the polymer layer of the rod, and 13 mm in the flight diameter of the screw.

Thus obtained screw was subjected to the following test.

Containers (each having a weight of 200 g) were transported on a loop container transport route having four curvature portions curved through a right angle with a radius of curvature of 650 mm and an overall length of screw of 16 m at room temperature at a container transport speed of 28 m/minute with a container transport pitch of 105 mm at a frequency of screw rotation of 800 rpm. As a result, the screw of the invention did not show a disturbance in the winding pitch of the cord even after the continuous transport for 60 days.

Example 2

A flexible screw was prepared in the same manner as ill Example 1 except that a cord having a specific amount of buckling of 0.01% was used.

Using the obtained screw, the same test as in Example 1 was conducted. As a result, disturbance in winding pitch was not observed even after the continuous transport for 60 days.

Comparative Example 1

A flexible screw was prepared in the same manner as in Example 1 except that a cord having a specific amount of buckling of 3% was used.

Using the obtained screw, the same test as in Example 1 was conducted. As a result, a disturbance in the winding pitch was observed on day 2.

Comparative Example 2

A flexible screw was prepared in the same manner as in Example 1 except that a cord having a specific amount of buckling of 1% was used.

Using the obtained screw, the same test as in Example 1 was conducted. As a result, a disturbance in the winding pitch was observed on day 15.

What we claim is:

1. A flexible screw for conveyors, which comprises a flexible rod and a polymer-coated cord helically wound on the rod, said cord comprising a core and a polymer layer formed on the core, and said core comprising a fiber bundle having a specific amount of buckling of not more than 0.3%.

2. The screw of claim 1, wherein said rod comprises a metal rope.

3. The screw of claim 2, wherein a polymer layer is formed on at least a part of said metal rope.

4. The screw of claim 3, wherein said polymer layer is prepared from a polymer having a flexural modulus of not more than 3000 kgf/cm$^2$, a coefficient of friction of not more than 2.0 and an abrasion loss of not more than 25 mg.

5. The screw of claim 1, wherein said polymer layer is prepared from a polymer having a flexural modulus of not more than 3000 kgf/cm$^2$, a coefficient of friction of not more than 2.0 and an abrasion loss of not more than 25 mg.

6. The screw of claim 4, wherein said polymer is a soft fluorocarbon resin.

7. The screw of claim 5, wherein said polymer is a soft fluorocarbon resin.

* * * * *